United States Patent [19]

French et al.

[11] 3,953,115

[45] Apr. 27, 1976

[54] METHOD FOR PROVIDING AN ABRASION RESISTANT COATING FOR PLASTIC OPHTHALMIC LENSES AND THE RESULTING LENSES

[75] Inventors: Hollis E. French, North Chelmsford; Jurgen M. Kruse, Lincoln, both of Mass.

[73] Assignee: Itek Corporation, Lexington, Mass.

[22] Filed: July 5, 1973

[21] Appl. No.: 376,505

Related U.S. Application Data

[63] Continuation-in-part of Ser. No. 342,101, March 16, 1973, abandoned.

[52] U.S. Cl. .................... 351/166; 260/46.5 UA; 350/175 NG; 427/40; 427/164; 427/341; 427/175 NG; 427/379; 427/387; 428/412; 428/447
[51] Int. Cl.² .................... G02C 7/02; B32B 27/28
[58] Field of Search ......... 117/33.3, 124 F, 161 ZA; 260/46.5 R, 46.5 UA; 427/162, 164, 387, 38, 40, 340, 341, 377, 379; 428/447, 412; 351/166; 350/175 NE

[56] References Cited
UNITED STATES PATENTS

| | | | |
|---|---|---|---|
| 3,258,382 | 6/1966 | Vincent | 260/46.5 R |
| 3,278,476 | 10/1966 | Santelli | 117/124 F |
| 3,367,910 | 2/1968 | Newing | 260/46.5 R |
| 3,389,114 | 6/1968 | Burzynski et al. | 260/46.5 R |
| 3,427,273 | 2/1969 | Newing | 260/46.5 R |
| 3,451,838 | 6/1969 | Burzynski et al. | 117/161 ZA |
| 3,458,342 | 7/1969 | Cormia | 428/412 |
| 3,637,416 | 1/1972 | Misch et al. | 428/412 |
| 3,650,808 | 3/1972 | Gognon | 427/387 |
| 3,713,880 | 1/1973 | Krekeler | 427/162 |

FOREIGN PATENTS OR APPLICATIONS

| | | | |
|---|---|---|---|
| 688,702 | 6/1964 | Canada | 117/124 F |

*Primary Examiner*—Ronald H. Smith
*Assistant Examiner*—William H. Schmidt
*Attorney, Agent, or Firm*—Homer O. Blair; Robert L. Nathans; David E. Brook

[57] ABSTRACT

A process is disclosed for applying an adherent, optically clear, abrasion resistant coating to plastic ophthalmic substrates such as plastic lenses. The process includes: (a) forming a partially hydrolyzed solution of a vinyltri(lower alkoxy)silane, such as vinyltriethoxysilane, in a water-miscible, volatile, organic solvent, the silane being present from 25–75% by weight; (b) applying a thin, uniform coating of the partially hydrolyzed solution to a clean surface of the ophthalmic lens; (c) maintaining the coated substrate in a high humidity and preferably elevated temperature environment until the silane is substantially completely hydrolyzed; and, (d) dehydrating the coated substrate under low humidity conditions at an elevated temperature below the temperature at which the substrate degrades until an adherent, abrasion resistant coating is formed. Plastic lenses and other ophthalmic plastic components coated according to the above process are also described.

25 Claims, 2 Drawing Figures

Uncoated, 1 lb.

Coated, 1 lb.

Uncoated, 4 lb.

Coated, 4 lb.

Uncoated, 7 lb.

Coated, 7 lb.

Uncoated, 10 lb.

Coated, 10 lb.

METHOD FOR PROVIDING AN ABRASION RESISTANT COATING FOR PLASTIC OPHTHALMIC LENSES AND THE RESULTING LENSES

CROSS REFERENCE TO RELATED APPLICATIONS

This is a continuation-in-part application of Ser. No. 342,101, filed Mar. 16, 1973 now abandoned.

BACKGROUND OF THE INVENTION

1. Field of the Invention

The invention relates to coatings for transparent polymeric substrates such as ophthalmic components and more particularly to optically clear, abrasion resistant, adherent coatings for polymeric ophthalmic lenses and the like such as those formed from polymerized CR-39 monomer.

2. Description of the Prior Art

Polymeric ophthalmic lenses have become increasingly popular recently due to their excellent optical properties, dimensional stability, chemical resistance, impact resistance, light weight, etc. One serious disadvantage, nevertheless, to polymeric ophthalmic lenses, has been their susceptibility to scratching, particularly compared to traditional glass lenses.

Much research has been devoted to providing coatings for polymeric lenses to improve their abrasion resistance. To date, however, none of the resultant coatings has proven totally successful as evidenced by their lack of commercial acceptance. This is probably because of the stringent requirements in optical and mechanical properties necessary in such coatings.

An example of one type of coating provided to solve this problem is given in U.S. Pat. No. 3,637,416 to Misch et al. The coatings described in the Misch et al. patent are applied by coating a plastic lens with a bonding or coupling film comprising an organic silicon compound and also coating it with a silica or silica gel. The preferred coating technique is a two-step technique, although both coatings can be applied simultaneously. Even in the one-step coating technique, however, the combination of both an organic silicon compound and a silica or silica gel forming compound is present.

Still other attempts are described in U.S. Pat. No. 3,713,880 to Krekeler et al. The coatings described by this patentee contain alkyl silicates, trifunctional and/or bifunctional organosilanes and antistatic additives.

Despite the large amount of prior research, there is still a need for a process of forming adherent, abrasion resistant, optically clear coatings on polymeric ophthalmic components.

SUMMARY OF AN EMBODIMENT OF THE INVENTION

An embodiment of this invention relates to a process by which abrasion resistant, adherent coatings can be applied to substrates such as polymeric eyeglass lenses. Successful coatings require careful control of narrowly defined parameters relating to both the compositions used and the coating techniques.

In the first step of the process, a partially hydrolyzed solution of a vinyltri(lower alkoxy)silane is formed using 25-75% by weight of the silane in a water-miscible, volatile, organic solvent. A preferred solution comprises about 50% of vinyltriethoxysilane in ethanol, partially hydrolyzed by adding small amounts of a dilute acidic solution and allowing the combined solutions to stand for sufficient periods of time such as one day.

A thin coating of the combined solutions is applied uniformly to the lens surface which has been meticulously cleaned. The coated lens is maintained in a high humidity environment, such as above 90% relative humidity and at an elevated temperature to complete hydrolysis of the silane. Subsequently, the coating is dehydrated at an elevated temperature under dry conditions to provide a coating having the required characteristics.

The coating process and the resultant coated lenses described herein have significant advantages over those previously known in the prior art. For example, the coatings produced have outstanding adhesion to the substrate, often being capable of withstanding immersion in boiling water for one hour, or low temperatures such as $-40°C$. on the other hand. The coatings are economical and easy to apply, e.g. they can even be dip or spray coated. A desirable feature of these coatings is their compatibility with many dyes which can be used to tint lenses. The dyes can be added to a common solvent which results in greatly simplified tinting procedures. A most significant advantage, of course, is the outstanding toughness, optical clarity and abrasion resistance which can be obtained with these coatings.

It is surprising in view of prior art teachings that suitable coatings can be prepared from solutions consisting essentially of a vinyltri(lower alkoxy)silane, such as vinyltriethoxysilane, in a suitable solvent. One would suspect that tetraethoxysilanes would form better coatings, but such is not the case as demonstrated by the examples presented below. Further, the prior art seems to teach that secondary silica gels or tetraethoxysilanes are necessarily present in significant amounts in abrasion resistant coatings for plastic substrates.

DESCRIPTION OF THE INVENTION

Figure 1:
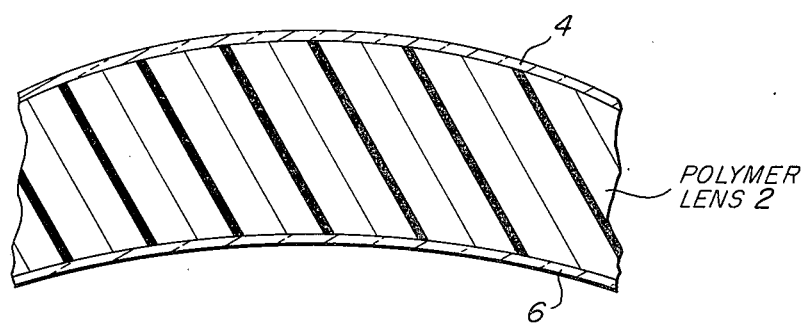
FIG. 1 is a schematic illustration of a plastic ophthalmic lens coated with an abrasion resistant coating as described herein.

The silane compounds suitable for producing the coatings described herein are vinyltri(lower alkoxy)silanes. Lower alkoxy includes methoxy, ethoxy or propoxy, i.e. $C_1$–$C_3$ alkoxy. The alkoxy groups can be the same, but need not be. Above $C_3$ alkoxy, the silanes are not sufficiently volatile or water miscible and are too shielding about the Si-O bond which tends to interfere with hydrolysis.

Suitable silanes can be represented by the following structural formula:

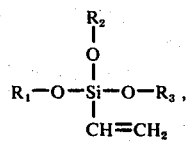

wherein $R_1$, $R_2$ and $R_3$ are individually selected from $C_1$–$C_3$ alkyl groups.

The silane is dissolved in a solvent in an amount of from about 25% to about 75% by weight and preferably in an amount around 50%. The amounts are based on the original, unhydrolyzed solution. As a general proposition, it is desirable to have just enough solvent to create one homogeneous phase to achieve the highest concentration of coating components consistent with good coating characteristics.

Preferred solvents are water miscible, lower molecular weight ($\epsilon_6$ or less), organic solvents. Included are such compounds as methanol, ethanol, propanol, isopropanol, acetone, methyl ethyl ketone and methyl isobutyl ketone. Isopropanol is a preferred solvent because of its volatility, cost and ready miscibility with both phases. In choosing a solvent, those skilled in the art will recognize that a balance is made between volatility and water miscibility on the one hand, and ability to dissolve the silane on the other hand.

Certain non-water miscible solvents such as benzene can also be used, but certain adjustments have to be made which make such solvents non-preferred.

The silane solution is partially hydrolyzed before it is coated on the ophthalmic substrate to achieve the desired coating rheology and proper hardening conditions. This can be accomplished by adding a dilute acidic solution to the silane solution, the acid acting to catalyse hydrolysis. For example, from about 7 to about 30 parts of 0.1N hydrochloric acid can be used per hundered parts of silane solution. Other diulte acids such as sulfuric, nitric, acetic, etc. can also be used.

The amount of hydrolysis desirable at this point is that which results in a desirable coating rheology and ultimate hardness. A viscosity of about 25 centipoises at the coating temperature (usually room temperature or 27°C.) has been found suitable.

Additionally, when the lens is coated, it is desirable to have the coating rapidly become "dust dry", i.e. dust will not stick to the surface thereof. This facilitates handling of the lens during subsequent processing.

Before the optical substrate is coated, it must be rigorously cleaned. The technique used is not as important as the result. Some cleaning solvents such as acetone and various other ketones can be used. Flame cleaning also is suitable. The preferred method of cleaning is to place the lens in a low temperature oxygen-containing plasma such as helium-oxygen plasma. Of course, if the lens surface were absolutely clean, such as might be the case with a brand new lens in a clean environment, cleaning may not be necessary.

The substrates can be coated with the pre-hydrolyzed solution by standard techniques such as spin coating, spray coating, dip coating, etc. Coating thicknesses, as applied wet, can range from about 0.5 to 8 microns and are preferably in the range of from about 3 to about 6 microns. The preferred dry coatings are about 1.5–3 microns thick. It is important, of course, to provide an even, uniform coating on most optical components, particularly ophthalmic lenses.

The coated components are subsequently hydrolyzed further in a high humidity environment, such as one having a relative humidity of equal to or greater than about 70% at a temperature in the range of from about 25°C. to about 80°C. Temperatures below about 25°C. result in much slower times, whereas temperatures above about 80°C. result in final coatings with poorer physical properties including abrasion resistance. The time of reaction in the high humidity environment will vary with the temperature, thickness, coating ingredients, exact relative humidity, etc. At 40°C. and with a 2–3 micron initial coating, a period of about 24 to 30 minutes has been found suitable. The preferred temperature range is from about 30° to about 50°C. because these temperatures produce coatings having outstanding abrasion resistance in reasonably short processing times. At the end of this hydrolysis treatment, it is believed that the great majority of Si—O—R bonds have gone to or through the Si—O—H stage at the completion of this step.

The substrate with its hydrolyzed coating is now dehydrated at an elevated temperature and low humidity conditions to form a silica-like network having Si—O—Si bonds. Preferred humidities are below 10% relative humidity, and particularly preferred are those of less than 1% often found in drying ovens. The lower temperature limit is established by practical cure times, and the upper limit is established by the thermal stability of the plastic substrate. With polymerized CR–39 lens substrates, it has been found that temperatures from about 70 to about 100 °C. and times of between about 2 and 200 hours are satisfactory. Preferably, the temperatures are 80–100°C., which normally result in dehydration times of about 5–8 hours. Above about 100°C., it has been found that CR–39 lenses tend to yellow. Other substrates can withstand higher temperatures, however. Polycarbonates, for example, are preferably dehydrated at about 100–120°C. In this dehydration step, it has been noted that the surface hardness appears first, followed by adhesion to the plastic ophthalmic substrate.

Curing catalysts, although not necessary, are customarily used to speed the hardening process of the partially hydrolyzed coatings. Suitable catalysts include amino($C_1$ to $C_8$ alkyl)tri-($C_1$ to $C_3$ alkoxy)silanes, such as aminopropyltriethoxysilane, and N(beta-amino ethyl)-gammaaminopropyltrimethoxysilane. It is believed that other amines would also be suitable as catalysts. From about 1 to about 20 parts by weight per 100 parts of the coating solution are used. Above about 20 parts, it has been noticed that the abrasion resistance falls off while amounts below about 1 don't substantially expedite cure time. Cure times stated herein are those wherein catalysts are used.

An additional optional ingredient comprises a solvent soluble dyestuff. In fact, this can be a unique advantage of the coating solutions described herein since many dyestuffs are soluble in the same solvents used for the silanes and are also chemically compatible with the partially reacted silanes. This is a great advantage in forming tinted lenses since the dyes used can be uniformly distributed in the coating solutions. Examples of such dyes include:

Dupont Luxal Fast Yellow T
Dupont Luxal Fast Blue MBSN
BASF Spirit Soluble Fast Blue H&L
Sandoz Acetosol Blue GLS
Ciba Orasol Red B
Ciba Orasol Red 2B
Ciba Orasol Yellow GN
Ciba Orasol Black CN.

Still another optional additive is one or more compatible leveling agents. These can be added in very small concentrations to optimize the coatings.

Suitable plastic ophthalmic substrates include substrates formed from homopolymers or copolymers of CR–39 (diethylene glycol bis(allyl carbonate) sold by PPG Industries, or other ophthalmic polymers such as TROGAMID nylon (Dynamite Nobel), acrylics, TEMA resins (American Cyanamid), polycarbonates, etc.

Although the major emphasis herein is placed on transparent ophthalmic substrates, any other substrate could be coated using the processes and compositions disclosed herein. Thus, substrates such as glass, abestos, talc, fibers, wood, etc. could be coated to improve their surface properties. Some pretreatment may be necessary, but those skilled in the art will know or be able to ascertain these using no more than routine experimentation.

FIG. 1 illustrates a section of an ophthalmic lens 2, such as an eyeglass lens, having coating 4 on its convex side and coating 6 on its concave side. Both of coatings 4 and 6 are adherent, optically clear, and more abrasion resistant than lens 2. Coatings 4 and 6 are applied to lens 2 by the techniques described herein. Even though lens 2 has sharply curved convex and concave surfaces, coatings 4 and 6 remain adherent and resistant to abrasion.

Abrasion resistance can be determined by rubbing the lens in one-inch strokes with 1/0 steel wool having a predetermined weight thereon.

Figure 2:
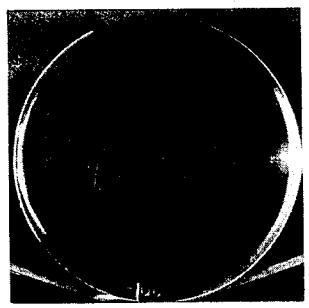
FIG. 2 illustrates actual photographs of uncoated and coated CR-39 lenses subjected to controlled abrasion resistance tests.
Figure 2:
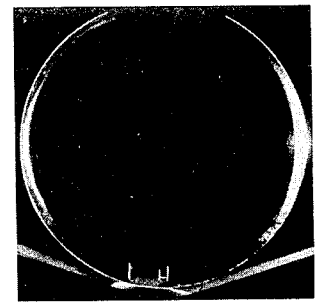
Figure 2:
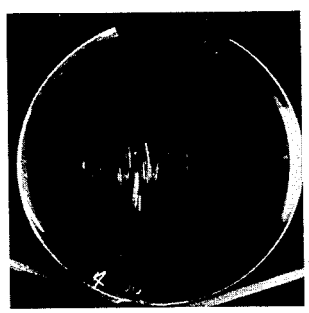
Figure 2:
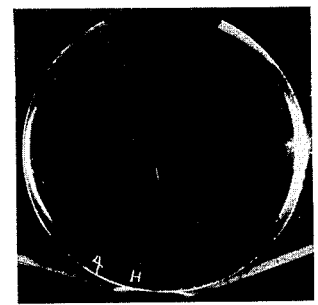
Figure 2:
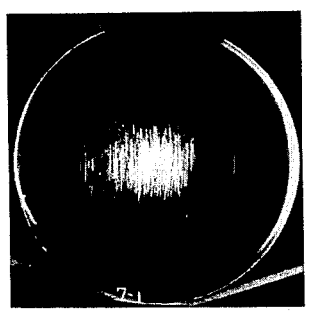
Figure 2:
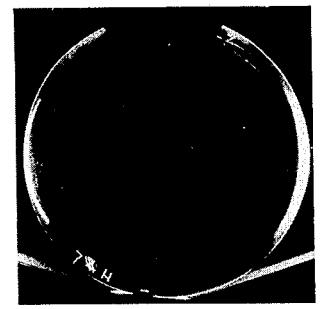
Figure 2:
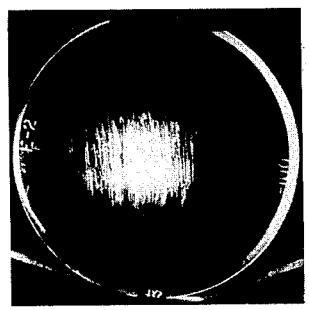
Figure 2:
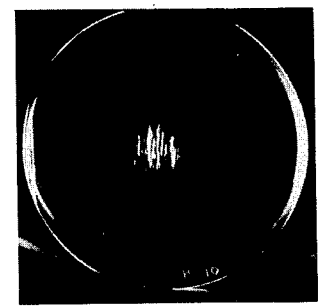

The advantage in abrasion resistance offered by the coatings described herein can be appreciated by referring to FIG. 2. All lenses shown therein were tested as described above. The lenses were photographed with a Polaroid camera under red laser light illumination. In all cases, the lenses were evaluated after 25 cycles with the designated weight applied to the steel wool.

The following examples further describe the invention.

EXAMPLE 1

A partially hydrolyzed solution of vinyltriethoxysilane was formed by dissolving 6.8 grams vinyltriethoxysilane (Union Carbide A-151) in 6.9 grams ethanol and 2.25 grams of 0.1N hydrochloric acid. The solution was allowed to stand for one day in a stoppered bottle at room temperature. After this period, it was coated onto a clean polymerized CR-39 eyeglass lens in a uniform coating approximately 4 microns thick. Solvent was allowed to evaporate in an ambient atmosphere, and after solvent evaporation, it was observed that the solution had not become "dust dry." The coated lens was placed in an oven maintained at 100°C. After two days, the coating was still not "dust dry." After ten days in the oven, the coating was examined again and found to be dry, hard and to have outstanding scratch resistance to 0000 steel wool.

Under heavy hand pressure, an uncoated CR-39 lens surface was severely scratched with 0000 steel wool after only a few rubs. The coated lens resisted more than 100 rubs before damage became severe; after 50 rubs, damage was not noticeable.

Although the coating produced was adherent and scratch resistant, the time and temperature of the cure required was sufficient to destroy the optical properties of the CR-39 substrate which had become very yellowed, cracked and crazed. The coating, although transparent, was also yellowed.

EXAMPLE 2

The procedure of Example 1 was repeated substituting a solution containing 8.4 grams amyltriethoxysilane, 6.9 grams ethanol and 2.25 grams of 0.1N hydrochloric acid. Even after 10 days in the oven at a temperature of 100°C., the resultant coating did not have good abrasion resistance.

EXAMPLE 3

The procedure of Example 1 was repeated substituting a solution of 8.6 grams phenyltriethoxysilane (Union Carbide A-153), 6.9 grams ethanol, and 2.25 grams of 0.1N hydrochloric acid. After 10 days in an oven at 100°C., the resultant coating still did not have good abrasion resistance.

EXAMPLE 4

A solution identical to that of Example 1 was prepared. Additionally, a second solution as follows was also prepared.

| | | |
|---|---|---|
| 100 | grams | tetraethylorthosilicate |
| 69.5 | grams | ethanol |
| 22.5 | grams | 0.1N hydrochloric acid. |

After aging for one day, 17 parts of the second solution was added to 70 parts of the solution of Example 1. Following the procedures of Example 1, a coating was applied to a clean CR-39 lens substrate, and it was noticed that the coating became "dust dry" within a few minutes after solvent evaporation began. The coated lens was cured for 18 hours at 95°C., but even after this time, its scratch resistance was poor. Additionally, it was noted that this coating would not pass a boiling water test without crazing.

EXAMPLE 5

One part by weight of gammaaminopropyltriethoxysilane (Union Carbide A-1100) as a catalyst was added to 100 parts of the combined coating solution of Example 4. The cure time for the coating was decreased, and the pot life was decreased dramatically. The coated lens would not pass the boiling water test. Its abrasion resistance was improved.

EXAMPLE 6

The procedure and compositions of Example 5 were used substituting three parts of A-1100. The resulting solution gelled before it could be coated.

EXAMPLE 7

The procedure of Example 1 was used and a partially hydrolyzed coating solution was prepared from the following:

| | |
|---|---|
| 47.5 grams | vinyltriethoxysilane |
| 48.3 grams | ethanol |
| 15.7 grams | 0.1N hydrochloric acid. |

The solution was allowed to stand at room temperature in a stoppered Erlenmeyer flask for one day. Ten parts of gammaaminopropyltriethoxysilane was added to 70 parts of the above solution and an even coating approximately 4 microns thick was spin coated onto a CR-39 lens which had been cleaned with oxygen plasma (3% $O_2$ in He, 1 mm. Hg. total pressure, 200 watts for 5 minutes with an LFE plasma oven). The coated lens was hydrolyzed at 90°C. at a relative humidity above 90% for one hour, followed by dehydration at 90°C. in a dry atmosphere. Cure (hydrolysis and dehydration) was complete in eight hours, and the resulting coating was optically clear, adhesive and had outstanding abrasion resistance. After immersion in boiling water for 10 minutes, the lens showed no deleterious effects. The coated lenses of FIG. 2 were produced using the procedure of this example.

EXAMPLE 8

The effect of cleaning was determined as follows. A formulation as described in Example 7 was coated onto different CR–39 lenses cleaned with various solvents and cleaning solutions. Only those coatings placed on lenses cleaned with acetone had the required adherence. In these tests, lenses cleaned with trichloroethylene, alcohols and hydrocarbons all produced poor adhesion to the coatings. This is believed to be due to the fact that these solvents failed to remove certain contaminants from the lens surface.

Dust free lens substrates cleaned with a low oxygen plasma (3% oxygen in helium, 1 mm. mercury, 5 minutes, 200 watts in LFE plasma cleaner) all displayed good adherent coatings.

EXAMPLE 9

The procedure and composition of Example 7 were used but the cure time was changed. The total cure time was reduced to seven hours and resulted in a coating having satisfactory optical and physical properties.

EXAMPLE 10

The procedure and composition of Example 9 were used except that N-beta(aminoethyl)gammaaminopropyltrimethoxysilane (Union Carbide A–1120) was substituted for the gammaaminopropyltriethoxysilane. The properties of the coatings were essentially the same as those prepared in Example 9.

EXAMPLE 11

The procedure and composition of Example 9 were used except that methylisobutylketone was substituted for ethanol as a common solvent. The results were similar to those of Example 9.

EXAMPLE 12

The procedure and composition of Example 9 were used, except that isopropyl alcohol was substituted for ethanol as the common solvent. The resulting coatings appeared to be substantially the same as those of Example 9.

EXAMPLE 13

The procedure and composition of Example 9 were used except that the coating was applied uniformly to provide a cured thickness of approximately 0.66 microns, approximately one-third of the thickness of those of Example 9. Although the abrasion resistance of the resulting coating was inferior to thicker coatings, it was better than uncoated CR–39 lenses.

EXAMPLE 14

A solution similar to that of Example 7 except that it was not prehydrolyzed was coated onto a CR–39 lens substrate. The solution separated into two phases after coating. The water phase evaporated leaving unreacted silane.

EXAMPLE 15

A solution according to Example 7 was insufficiently prehydrolyzed prior to coating. After addition of A–1100, the solution was coated. Unreacted water in the solution made the coating completely unacceptable from a rheological point of view.

EXAMPLE 16

A concentrated solution of Ciba dye "Orasol Black CN" was prepared by saturating the coating solution of Example 7 with excess dye (1–2 grams per 50 ml.). After filtering, 14 parts of gammaaminopropyltriethoxysilane was added per 100 parts solution and a CR–39 lens was coated according to the procedure in Example 7. The final coating was adherent, abrasion resistant and colored a good neutral density gray. The dye was lightfast.

What is claimed is:
1. A process for forming an abrasion resistant, adherent coating on a polymeric optical component, comprising:
    a. forming a solution consisting essentially of a partially hydrolyzed vinyltri(lower alkoxy)silane in a water-miscible, volatile, organic solvent wherein said partially hydrolyzed vinyltri(lower alkoxy)silane is present from about 25 to about 75% by weight;
    b. applying a thin, uniform coating of said solution to a clean surface of the optical component;
    c. maintaining said coated component in an environment having a relative humidity greater than or equal to 70% and at a temperature of from about 25°C. to about 80°C.; and,
    d. dehydrating said coated component at an elevated temperature below the temperature at which the component degrades until an adherent, abrasion resistant coating is formed.
2. A process of claim 1 wherein said optical component is formed from a polymeric material containing a major amount of diethylene glycol bis(allyl carbonate).
3. A process of claim 1 wherein said optical component comprises a polymeric, ophthalmic lens formed from a polymer consisting essentially of diethylene glycol bis(allyl carbonate).
4. A process of claim 3 wherein said silane consists essentially of vinyltriethoxysilane.
5. A process of claim 4 wherein said coated lens is maintained at a temperature of from about 30°C. to about 50°C. and a relative humidity above about 70% for a period of about 24 to about 30 minutes thereby allowing further hydrolysis of Si—O—R bonds where R is lower alkyl.
6. A process of claim 5 wherein said coated lens is dehydrated in an atmosphere having a relative humidity below about 10% and at a temperature between about 80°C. and about 100°C.
7. A process of claim 6 wherein said solution is formed using a solvent chosen from ethanol and isopropanol.
8. A process of claim 7 wherein said wet coating is applied to said lens from about 3 to about 6 microns thick.
9. A process of claim 8 wherein said lens surface is cleaned using an oxygen containing plasma prior to coating.
10. A process of claim 9 wherein said solution of a vinyltri(lower alkoxy)silane is partially hydrolyzed to a degree sufficient to provide said solution with a visocsity of about 25 centipoises at room temperature.
11. A process of claim 10 wherein said vinyltriethoxysilane is present in said solution in an amount of about

50%.

12. A coated ophthalmic component prepared according to the process of claim 1.

13. A coated ophthalmic component prepared according to the process of claim 4.

14. A coated ophthalmic component prepared according to the process of claim 11.

15. A process of claim 1 wherein said partially hydrolyzed solution of a vinyltri(lower alkoxy)silane contains from about 1 to about 20 weight percent of a curing catalyst.

16. A process of claim 15 wherein said curing catalyst comprises a $C_1$–$C_8$ alkyltri($C_1$–$C_3$ alkoxy)silane.

17. A process of claim 16 wherein said catalyst comprises aminopropyltriethoxysilane.

18. A process of claim 16 wherein said catalyst comprises N(beta-amino ethyl)-gammaaminopropyltrimethoxysilane.

19. A process for forming a thin, abrasion resistant, adherent, optically clear coating on a polymerized diethylene glycol bis(allyl carbonate) ophthalmic lens, comprising:
    a. forming a solution consisting essentially of vinyltriethoxysilane in a water-miscible, volatile, organic solvent, said vinyl triethoxysilane being present in an amount of about 50% by weight;
    b. partially hydrolyzing said solution by contacting it with from about 7 to about 30 parts by weight of 0.1N hydrochloric acid per 100 parts of solution;
    c. applying a coating of from about 3 to about 6 microns of said partially hydrolyzed solution to a clean surface of said lens;
    d. maintaining said coated lens for at least about 24 minutes at a temperature between about 30°C. and 50°C. and a relative humidity above 90%; and,
    e. dehydrating said coated lens at a temperature of from about 80°C. to about 100°C. and a relative humidity below about 10% to form an abrasion resistant, adherent, optically clear coating thereon, said dry coating having a thickness of from about 1.5 microns to about 3 microns.

20. A process of claim 19 wherein said partially hydrolyzed solution of a vinyltri(lower alkoxy)silane contains from about 1 to about 20 weight percent of a curing catalyst.

21. A process of claim 20 wherein said curing catalyst comprises a $C_1$–$C_8$ alkyltri($C_1$–$C_3$ alkoxy)silane.

22. A process of claim 21 wherein said catalyst comprises aminopropyltriethoxysilane.

23. A process of claim 21 wherein said catalyst comprises N(beta-amino ethyl)-gammaaminopropyltrimethoxysilane.

24. A process for coating a polymeric substrate, comprising:
    a. forming a solution consisting essentially of a partially hydrolyzed vinyltri(lower alkoxy)silane in a water-miscible, volatile, organic solvent wherein said partially hydrolyzed vinyltri(lower alkoxy)silane is present from about 25 to about 75% by weight;
    b. applying a thin, uniform coating of said solution to a clean surface of the substrate;
    c. maintaining said coated substrate in an environment having a relative humidity greater than or equal to 70% and at a temperature of from about 25°C. to about 80°C.; and,
    d. dehydrating said coated substrate at an elevated temperature below the temperature at which the substrate degrades until an adherent, abrasion resistant coating is formed.

25. A process of claim 24 wherein said silane consists essentially of vinyltriethoxysilane.

* * * * *